United States Patent [19]

Shust et al.

[11] Patent Number: 4,685,340

[45] Date of Patent: Aug. 11, 1987

[54] TWO SPEED POWER TAKE-OFF

[75] Inventors: Ryan E. Shust; Fergus J. MacCourt, both of Winnipeg, Canada

[73] Assignee: Versatile Corporation, Vancouver, Canada

[21] Appl. No.: 817,276

[22] Filed: Jan. 8, 1986

[51] Int. Cl.[4] ............................................. F16H 37/00
[52] U.S. Cl. ....................................... 74/11; 74/15.6; 74/325; 403/359
[58] Field of Search .............. 74/11, 15.2, 15.4, 15.69, 74/15.8, 325, 15.6; 403/3, 4, 359

[56] References Cited

U.S. PATENT DOCUMENTS

| | | | |
|---|---|---|---|
| 2,975,643 | 3/1961 | Ferguson | 74/15.2 |
| 3,279,275 | 10/1966 | Christie | 74/15.4 |
| 3,338,603 | 8/1967 | Sheppard | 403/359 |
| 3,513,712 | 5/1970 | Zajichek et al. | 74/15.4 |
| 3,715,704 | 2/1973 | Boyle et al. | 74/15.4 |
| 3,991,629 | 11/1976 | Dearnley | 74/15.4 |
| 4,546,661 | 10/1985 | Weis et al. | 74/15.4 |

Primary Examiner—Richard J. Scanlan, Jr.
Assistant Examiner—Anthony Knight
Attorney, Agent, or Firm—John R. Uren; Deborah A. Peacock

[57] ABSTRACT

A two speed power take-off with a reversible adaptor flange and a connected drive shaft for connection to either of two drive flanges rotating at different speeds. The adaptor flange has an inner and outer transition area with a plurality of bolt holes drilled in each area. The axes of the bolt holes in each area are at different angles such that the holes in one transition area match with receiving holes in one drive flange and, when the adaptor flange is reversed, the holes in the other transition area match with the receiving holes in the other drive flange.

2 Claims, 2 Drawing Figures

TWO SPEED POWER TAKE-OFF

INTRODUCTION

This application relates to a power take-off and, more particularly, to a power take-off capable of operating at two different rotational speeds.

BACKGROUND OF THE INVENTION

Power take-offs of a tractor are used to operate attached implements. These power take-offs operate at a single speed which may be outside the desirable speed range of the implement. If so, the operating speed of the power take-off will be unsuitable. More recently, power take-off drop boxes have been designed to operate at either of two speeds. Such assemblies are based on a reversible mounting plate and an attached drive shaft as disclosed, for example, in U.S. Pat. Nos. 3,991,629 (Dearnley) and 3,513,712 (Zajichek et al).

In the Zajichek et al apparatus, first and second drive flanges are provided, each of which rotates at a different speed. A drive shaft is attached to a reversible adaptor flange which is attached by a plurality of bolts to either the first or second drive flange. There are two sets of bolt holes, one set located near the outer area of the adaptor flange and the other set located near the inner area of the adaptor flange. Because of deliberate misalignment of the two sets of bolt holes, it is impossible to insert all of the attachment bolts in the incorrect receiving holes. Nevertheless, it is possible to insert one of the bolts in the incorrect bolt receiving hole. This will, of course, result in some fracture damage to the apparatus if it is subsequently operated in such a condition.

In the Dearnley apparatus, two drive flanges are again provided together with a reversible adaptor flange. The drive flanges, however, are designed such that when specialized bolts of a correct length are used, they are of insufficient length to engage improper mating holes. Nevertheless, if bolts of incorrect length are used, they may engage both flanges which can also cause fracture of the apparatus when operated in such condition.

SUMMARY OF THE INVENTION

According to the present invention, there is disclosed a two speed power take-off assembly comprising a first drive flange operable at a first speed, a first set of bolt receiving holes in said first drive flange, a second drive flange operable at a second speed, a second set of bolt receiving holes in said second drive flange, an adaptor flange rigidly connected to a power take-off drive shaft, a first set of attachment holes in said adaptor flange, each of said holes having a first axis, a second set of attachment holes in said adaptor flange, each of said holes having a second axis, said first axis being angularly offset relative to said second axis, said adaptor flange defining said holes positioned for matching said first set of holes in said adaptor flange with said first set of holes in said first drive flange and for matching said second set of holes in said adaptor flange with said second set of holes in said second drive flange by reversibly positioning said adaptor flange.

BRIEF DESCRIPTION OF THE SEVERAL VIEWS OF THE DRAWINGS

A specific embodiment of the invention will now be described, by way of example only, with the use of drawings in which.

DESCRIPTION OF SPECIFIC EMBODIMENT

Figure 1:
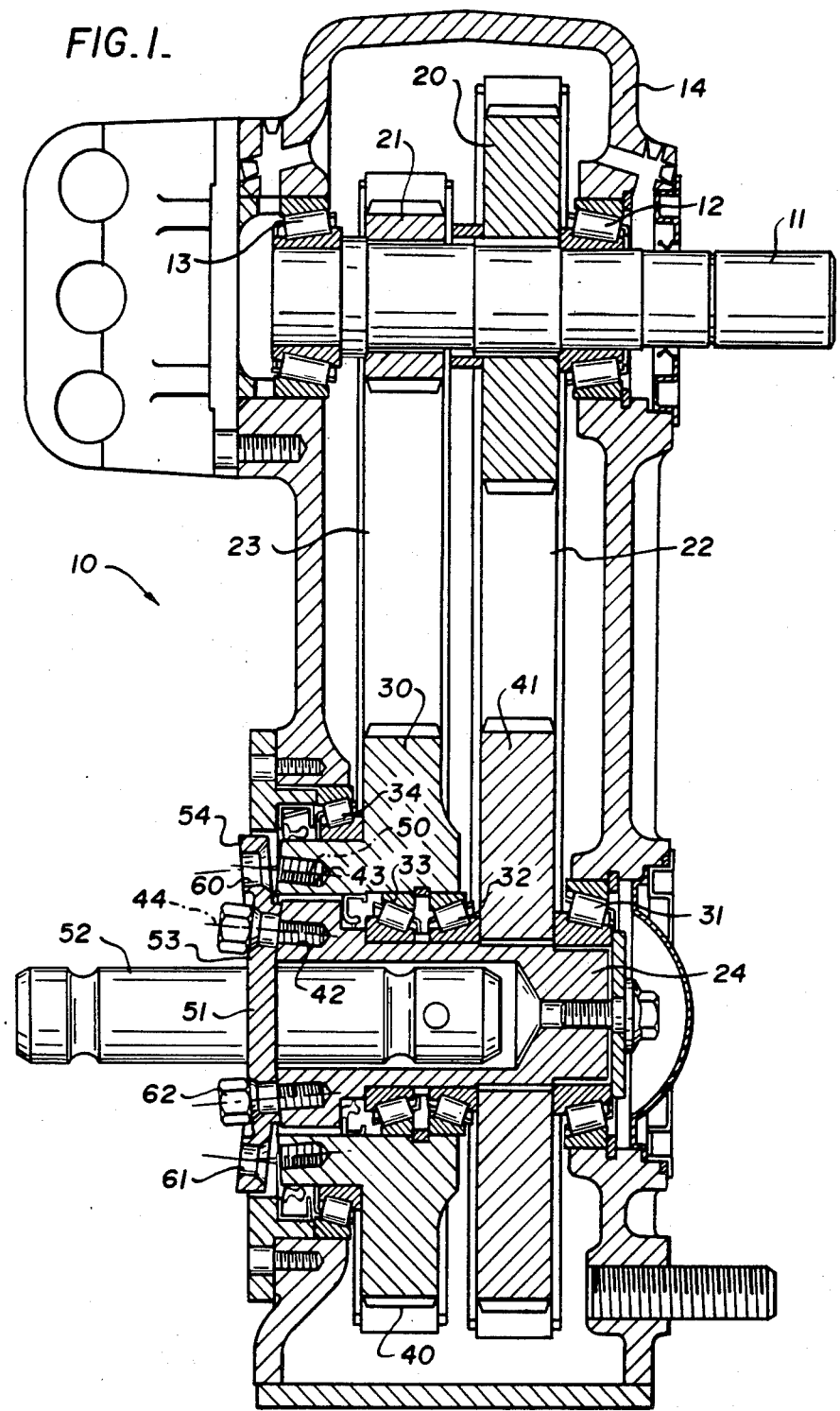
FIG. 1 is a cutaway view of a power take-off assembly with the adaptor flange shown in a first operating position.

Referring now to the drawings, a two speed power take-off assembly is shown generally at 10 in FIG. 1. An input shaft 11 receives power from the engine of the vehicle (not shown) and is journalled in roller bearings 12, 13. Roller bearings 12, 13 are journalled in power take-off assembly housing 14.

First and second chain sprockets 20, 21 are connected to input shaft 11 and chains 22, 23 are mounted on sprockets 20, 21, respectively.

First and second drive flanges 24, 30 are mounted in the lower area of the power take-off assembly housing 14. First drive flange 24 is journalled in tapered roller bearing 31 and two further tapered roller bearings 32, 33 are mounted around drive flange 24. Second drive flange 30 is journalled between tapered roller bearings 32, 33 and tapered roller bearing 34 which is mounted in power take-off assembly housing 14. Drive flange 30 includes a driven chain sprocket 40. A chain sprocket 41 is rigidly connected to first drive flange 24. The chains 22, 23 extend to and are mounted on the chain sprockets 40, 41.

A plurality of bolt receiving holes 42 inclined with respect to the axis of the power take-off drive shaft are machined in first drive flange 24. A plurality of inclined bolt receiving holes 43 are also machined in second drive flange 30. The axes 44, 50 of inclination of bolt holes 42, 43, respectively, are identical.

An adaptor flange 51 is rigidly mounted to power take-off shaft 52. The adaptor flange defines inner and outer circumferential transition areas 53, 54. In each transition area, a plurality of diameters 60, 61, respectively, are drilled, all with axes angularly offset from the axis of power take-off shaft 52 but inclined such that diameters 61 in adaptor flange 51 match with receiving diameters 43 in second drive flange 30 and, when reversed, the diameters 60 in adaptor flange 51 match with diameters 42 in first drive flange 24. Bolts 62 connect the adaptor flange 51 to either of the drive flanges 24, 30.

First and second chain sprockets 20, 21 are of different diameters to provide the necessary and desired speed of revolution to chain sprockets 40, 41 and their respective drive flanges 24, 30. In the particular embodiment described, the drive flange 24 is designed to have an output revolution speed of 1000 rpm and drive flange 30 is designed to have an output revolution speed of 540 rpm.

OPERATION

Figure 2:
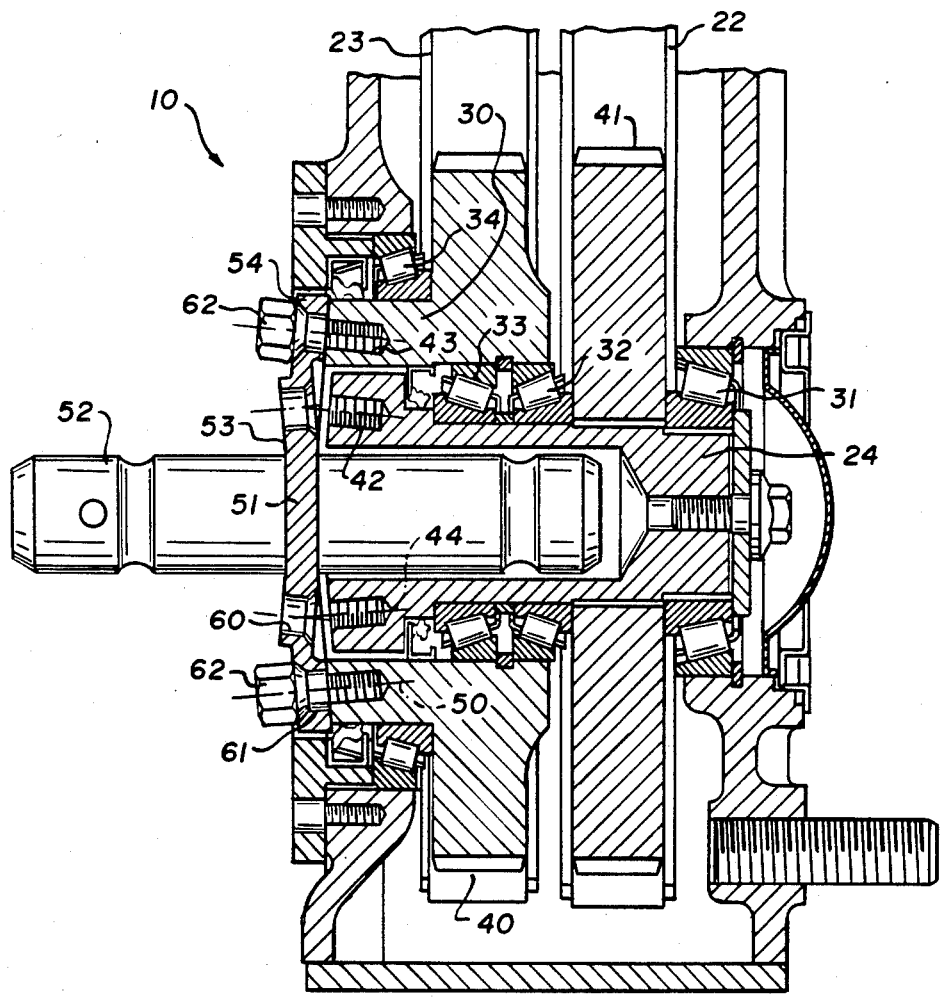
FIG. 2 is a cutaway view of the lower area of the power take-off assembly with the adaptor flange reversed.

In operation, it will be assumed the adaptor flange 51 is connected to drive flange 30 as depicted with bolts 62 (FIG. 2). The input shaft 11 is turned by the engine of the vehicle (not shown). First and second chain sprockets 20, 21 are connected directly to input shaft 11 and rotate at the same speed. The first and second chains 22, 23 are driven by first and second chain sprockets 20, 21 respectively, and they, in turn, drive chain sprockets 41, 40 respectively. Chain sprocket 20, having a larger diameter than chain sprocket 21, drives first chain 22 at a greater speed than second chain 23 and, therefore, chain sprocket 41 revolves at a greater speed than chain sprocket 40.

Chain sprocket 41 is connected to first drive flange 24 and, therefore, drive flange 24 rotates at the same speed as chain sprocket 41. Chain sprocket 40 is integral with drive flange 30 and, therefore, both chain sprocket 40 and drive flange 30 rotate at the same speed. Adaptor flange 51 is connected to drive flange 30 by bolts 62 and, therefore, rotates at the same speed as drive flange 30. Power take-off shaft 52, being connected to adaptor flange 51 rotates with the same speed as the drive flange 30.

If it is desired to increase the speed of the power take-off shaft 30, bolts 62 are removed and the adaptor flange 51 is reversed. This will match the diameter 60 in adaptor flange 51 with the receiving holes 42 in drive flange 24 as illustrated in FIG. 1. Bolts 62 are installed and, thereafter, the power take-off shaft 52 will revolve at the same speed as drive flange 24.

It will be observed that because of the offset axes of the diameters 60, 61, it will not be possible to insert a bolt 62 through one of the diameters 60 in inner transition area 53 while simultaneously inserting a bolt 62 through the diameters 61 in the outer transition area 54. Thus, any possibility of damage occurring because of operator confusion is minimized.

Rather than having the axes of diameters 60, 61 angularly offset, the axes of diameters 42, 43 on the drive flanges 24, 30 could be angularly offset with the axes on diameters 60, 61 parallel. A similar preventive effect would be obtained while the operating advantages are retained.

A specific embodiment of the invention has thus been described which should be taken as illustrative only and not as limiting the scope of the invention. Many additional changes may be made without departing from the scope of the invention as defined in the accompanying claims.

I claim:

1. A two speed power take-off assembly comprising a first drive flange operable at a first speed, a first set of bolt receiving holes in said first drive flange, a second drive flange operable at a second speed, a second set of bolt receiving holes in said second drive flange, an adaptor flange rigidly connected to a power take-off drive shaft, a first set of attachment holes in said adaptor flange, each of said holes having a first axis, a second set of attachment holes in said adaptor flange, each of said holes having a second axis, said first axis being angularly offset relative to said second axis, said adaptor flange defining said holes positioned for matching said first set of holes in said adaptor flange with said first set of holes in said first drive flange and for matching said second set of holes in said adaptor flange with said second set of holes in said second drive flange by reversibly positioning said adaptor flange.

2. A two speed power take-off assembly comprising a power take-off drive shaft, a first drive flange, a first plurality of receiving holes in said first drive flange, a second drive flange, a second plurality of receiving holes in said second drive flange, an adaptor flange defining a first and second set of receiving holes, said first set of holes in said adaptor flange matching said first plurality of holes in said first drive flange and said second set of holes in said adaptor flange matching said second plurality of receiving holes in said second drive flange by reversibly positioning said adaptor flange, the axes of said first plurality of receiving holes being angularly offset respective to the axes of said second plurality of receiving holes.

* * * * *